May 21, 1935.　　　　F. GOSSLAU　　　2,002,316
MACHINE SET COMPOSED OF TWO ENGINES AND A DRIVEN MACHINE
Filed Sept. 29, 1931

Inventor
Fritz Gosslau
by Knight Bros
Attorneys

Patented May 21, 1935

2,002,316

UNITED STATES PATENT OFFICE 2,002,316

MACHINE SET COMPOSED OF TWO ENGINES AND A DRIVEN MACHINE

Fritz Gosslau, Berlin-Charlottenburg, Germany, assignor to Siemens & Halske Aktiengesellschaft, Siemensstadt, near Berlin, Germany, a corporation of Germany Application September 29, 1931, Serial No. 565,805
In Germany October 3, 1930

3 Claims. (Cl. 123—2)

My invention relates to a machine set composed of two prime movers and a driven machine, and consists in an arrangement for driving a work-performing machine, the provision of two internal combustion engines with radially arranged cylinders placed at the two ends of the driven machine. The casings of the internal combustion engines are attached directly to the casing ends of the driven machine and the shaft of the driven machine is coupled to the shafts of the two internal combustion engines. With this arrangement a machine set is obtained requiring a relatively small space. My invention is particularly intended for driving high power capacity machines. If that size of machine is driven by a single internal combustion engine having a correspondingly high power output, the advantage of requiring only a small space is partly lost, since the dimensions of the internal combustion engines increase at an incomparatively greater rate than their power output.

An example for carrying out my invention is illustrated in the accompanying drawing in which:—

Figure 1:
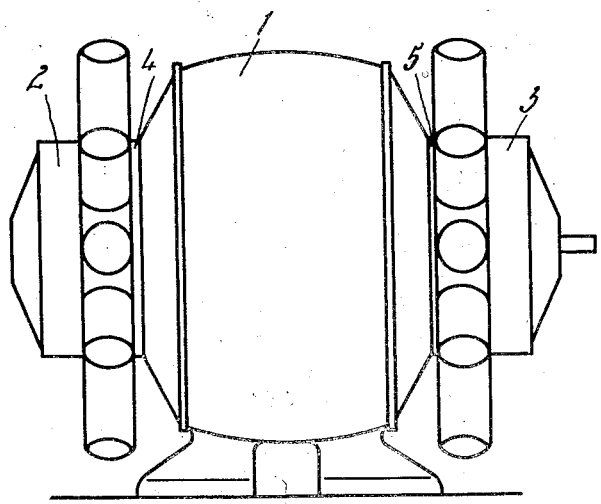
Figure 2:
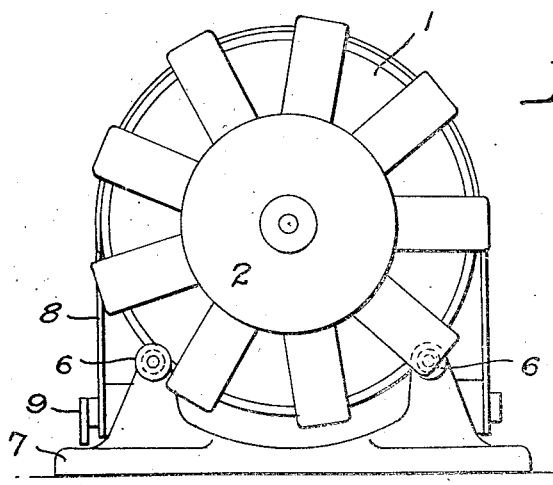

Fig. 1 represents a side elevation giving a general view of the machine unit, and Fig. 2 represents an end elevation of the unit, showing some additional details.

Referring to the drawing the work-performing machine is represented as a dynamo-electric generator 1, whose shaft 11 is directly connected to the crank shafts of two nine-cylinder stationary radial cylinder engines 2 and 3. Instead of the electric generator, any other kind of power consuming machine may be employed, for example a centrifugal pump, a blower and the like. The casings of the two engines are fastened to the generator casing by means of the flanges 4 and 5. The detail construction of the internal combustion engines is entirely immaterial, so far as the present invention is concerned.

The casing of the driven machine may be placed on rollers, in order to be turnable about its axis. Repairs on the individual cylinders of the internal combustion engines can, therefore, be readily carried out without having to take off the whole driving engine.

For this purpose, for example the base 7 of the unit carries two oppositely disposed parallel shafts journalled in suitably shaped portions of the base. Each shaft carries at its ends rollers 6, on which the driven machine rests, thereby permitting the rotation of the power unit for the purpose aforementioned. Of course, during the operation of the unit the casing must be held stationary, which may be accomplished by any suitable means, for instance by a shackle 8, clamped tightly around the casing of the generator 1, and attached at its ends to the base 7, as shown at 9.

I claim:

1. A machine set composed of a driven machine, and of two internal combustion engines of the radial type located at the two ends of the driven machine, and having their casings attached directly to the casing of the driven machine, the two ends of the shaft of the driven machine being coupled to the shafts of the internal combustion engines whereby the driven machine serves as a support for the internal combustion engines.

2. A machine set composed of a driven machine, and of two internal combustion engines of the radial type located at the two ends of the driven machine, and having their casings attached directly to the casing of the driven machine, the two ends of the shaft of the driven machine being coupled to the shafts of the internal combustion engines, and rollers for supporting the casing of the driven machine to permit said casing of being turned about the axis of its shaft to give convenient access to the cylinders of the engines.

3. A machine set composed of a driven machine, and of two internal combustion engines of the radial type located at the two ends of the driven machine, and having their casings attached directly to the casing of the driven machine, the two ends of the shaft of the driven machine being coupled to the shafts of the internal combustion engines, and rollers for supporting the casing of the driven machine to permit said casing of being turned about the axis of its shaft to give convenient access to the cylinders of the engines, and means for preventing the casing of the driven machine from turning when in service.

FRITZ GOSSLAU.